US012168928B2

(12) United States Patent
Johnston et al.

(10) Patent No.: US 12,168,928 B2
(45) Date of Patent: Dec. 17, 2024

(54) GRATING POSITION DITHERING FOR IMPROVED DISTRIBUTED ACOUSTIC SENSING ENGINEERED FIBER PERFORMANCE

(71) Applicant: Baker Hughes Oilfield Operations LLC, Houston, TX (US)

(72) Inventors: William Johnston, Houston, TX (US); Paul Wysocki, Blacksburg, VA (US); Dan Provenzano, Blacksburg, VA (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 88 days.

(21) Appl. No.: 17/524,615

(22) Filed: Nov. 11, 2021

(65) Prior Publication Data

US 2023/0141615 A1 May 11, 2023

(51) Int. Cl.
*G02B 6/293* (2006.01)
*E21B 47/135* (2012.01)
*G01V 8/16* (2006.01)
*H04B 10/25* (2013.01)

(52) U.S. Cl.
CPC .............. *E21B 47/135* (2020.05); *G01V 8/16* (2013.01); *G02B 6/2931* (2013.01); *H04B 10/25* (2013.01)

(58) Field of Classification Search
CPC .... G02B 6/2931; G02B 6/2932; E21B 47/135
See application file for complete search history.

(56) References Cited

U.S. PATENT DOCUMENTS 10,327,645 B2 * 6/2019 Rourke ................ A61B 5/6851
2006/0140529 A1 6/2006 Childers
2012/0175513 A1 7/2012 Duncan et al.
2013/0333476 A1 * 12/2013 Omichi .................. G01H 9/004 73/655
2016/0223710 A1 * 8/2016 Barry ........................ G01V 8/16
2018/0252097 A1 9/2018 Skinner et al.
2019/0219441 A1 * 7/2019 Cedilnik ............ G01D 5/35361
2020/0150301 A1 5/2020 Hallemeier et al.
2023/0033128 A1 * 2/2023 Wysocki .................. G01V 1/40

FOREIGN PATENT DOCUMENTS

DE 60221681 T2 * 4/2008 ......... G01D 5/35383
EP 3537110 B1 * 4/2023 ............. G01D 18/00

OTHER PUBLICATIONS

International Search Report and Written Opinion Issued in International Application No. PCT/US2022/079289 mailed Mar. 17, 2023; 11 Pages.

* cited by examiner

*Primary Examiner* — Eric Wong
(74) *Attorney, Agent, or Firm* — Baker Hughes Patent Organization

(57) ABSTRACT

An optical system employs a method for measuring an acoustic signal in a wellbore. The optical system includes an optical interrogator and an optical fiber. The optical fiber has a plurality of nominal sites uniformly spaced apart along a longitudinal axis of the optical fiber. A plurality of gratings are formed in the optical fiber. Each of the plurality of gratings is associated with a nominal site and is separated from its associated nominal site by an offset distance. The offset distance is selected to reduce a destructive interference between reflections from the plurality of gratings. The optical interrogator transmits a light pulse into the optical fiber to measure the acoustic signal via a reflection of the light pulse from at least one of the plurality of gratings.

13 Claims, 4 Drawing Sheets

GRATING POSITION DITHERING FOR IMPROVED DISTRIBUTED ACOUSTIC SENSING ENGINEERED FIBER PERFORMANCE

BACKGROUND

In the resource recovery industry, acoustic downhole measurements can be obtained from a wellbore using an optical system including an optical interrogator and an optical fiber extending from the optical interrogator into the wellbore. The optical fiber has a plurality of light scatterers along its length. The optical interrogator transmits a light into the optical fiber and records a reflection of the light from the scatterers. An acoustic signal impinging on the optical fiber changes a wavelength of the reflected light, which can be read at the optical interrogator to measure the acoustic signal. However, destructive interference can occur due to uniform spacing between gratings, thereby resulting in a weak optical signal being received at the optical interrogator. Therefore, it is desirable to be able to reduce the effects of destructive interference in an optical fiber used in acoustic downhole measurements.

SUMMARY

Disclosed herein is an optical system for measuring an acoustic signal. The optical system includes an optical interrogator, an optical fiber and a plurality of gratings formed in the optical fiber. The optical interrogator is configured to transmit a light pulse. The optical fiber receives the light pulse. The optical fiber has a plurality of nominal sites uniformly spaced apart along a longitudinal axis of the optical fiber. The plurality of gratings are formed in the optical fiber, each of the plurality of gratings associated with a nominal site and separated from its associated nominal site by an offset distance. The offset distance is selected to reduce a destructive interference between reflections from the plurality of gratings.

Also disclosed herein is a method of measuring an acoustic signal in a wellbore. An optical fiber is disposed in the wellbore, the optical fiber having a plurality of gratings formed therein, each of the plurality of gratings being located at a selected offset distance from a respective one of a plurality of nominal sites of the optical fiber, the plurality of nominal sites being uniformly spaced along a longitudinal axis of the optical fiber, wherein each offset distance is selected to reduce a destructive interference between reflections from the plurality of gratings. An optical interrogator transmits a light pulse into the optical fiber to measure the acoustic signal via a reflection of the light pulse from at least one of the plurality of gratings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
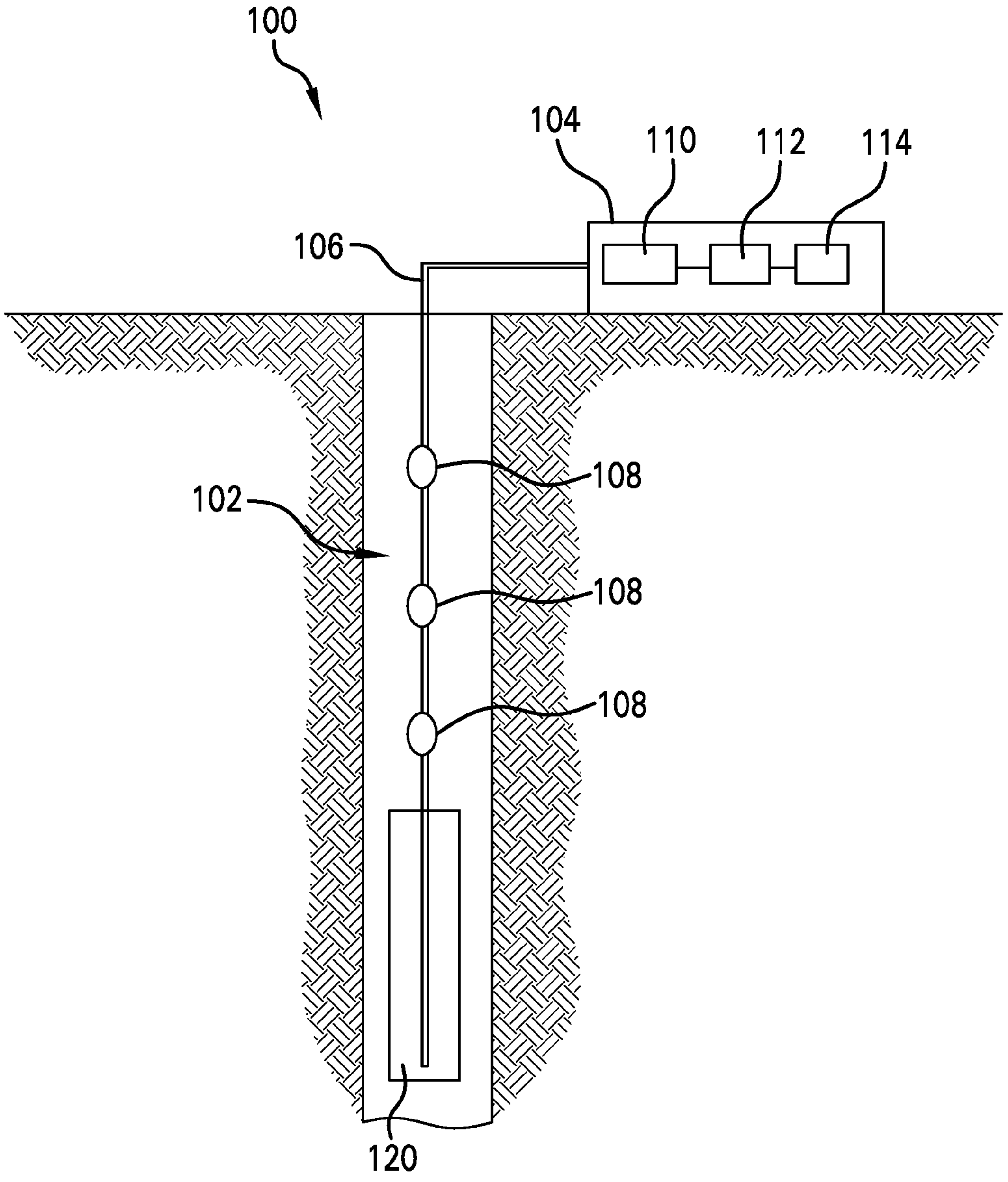
FIG. 1 shows an optical system for obtaining a measurement of a downhole parameter from a wellbore in an embodiment.

Referring to FIG. 1, an optical system 100 for obtaining a measurement of a downhole parameter from a wellbore 102 is shown in an embodiment. In various embodiments, the optical system 100 is a Distributed Acoustic Sensing (DAS) system that uses light to measure acoustic signals or acoustic waves within the wellbore 102.

The optical system 100 includes an optical interrogation unit 104, generally at a surface location, and an optical fiber 106 extending from the optical interrogation unit 104 into the wellbore 102. A plurality of scatterers 108 are distributed along a length of the optical fiber 106. The scatterers 108 can be scattering sites within the optical fiber that reflect light due to Rayleigh scattering, or they can be gratings, such as Fiber Bragg Gratings (FBGs), that are formed therein intentionally during a manufacturing process). In one embodiment, the optical fiber 106 is disposed on or in relation to a carrier or tool 120, such as a drill string segment, downhole tool or bottomhole assembly. As described herein, a "carrier" refers to any structure suitable for being lowered into a wellbore or for connecting a drill or downhole tool to the surface and is not limited to the structure and configuration described herein. Examples of carriers include casing pipes, wirelines, wireline sondes, slickline sondes, drop shots, downhole subs, bottomhole assemblies, drill string inserts, modules, internal housings and substrate portions thereof.

The optical interrogation unit 104 includes a laser 110 or other light source, a detector 112 and a processor 114. The detector 112 may be any suitable type of photodetector such as a diode assembly. The detector 112 is configured to receive return signals reflected from the scatterers 108 and generate measurement data. Exemplary parameters that can be measured using the optical fiber 106 include temperature, strain, pressure, position, and vibration.

In operation, the laser 110 transmits a light pulse into the optical fiber 106. In various embodiments, a wavelength of the light pulse is 1550 nanometers (nm). However, those having skill in the art would recognize that the optical system 100 and optical fiber 106 can be constructed to operate with respect to any selected wavelength of the light pulse. The light pulse has a spatial length within the optical fiber 106 is referred to herein as a light pulse length. In various embodiments, the light pulse length is in a range from about 1 meter to about 15 meters. The light pulse travels along the optical fiber 106 and is reflected back to the optical interrogation unit 104 from various locations within the optical fiber by the scatterers 108 therein. The reflected signal is received by the detector 112 and is analyzed at the processor 114 to estimate desired parameters.

Figure 2:
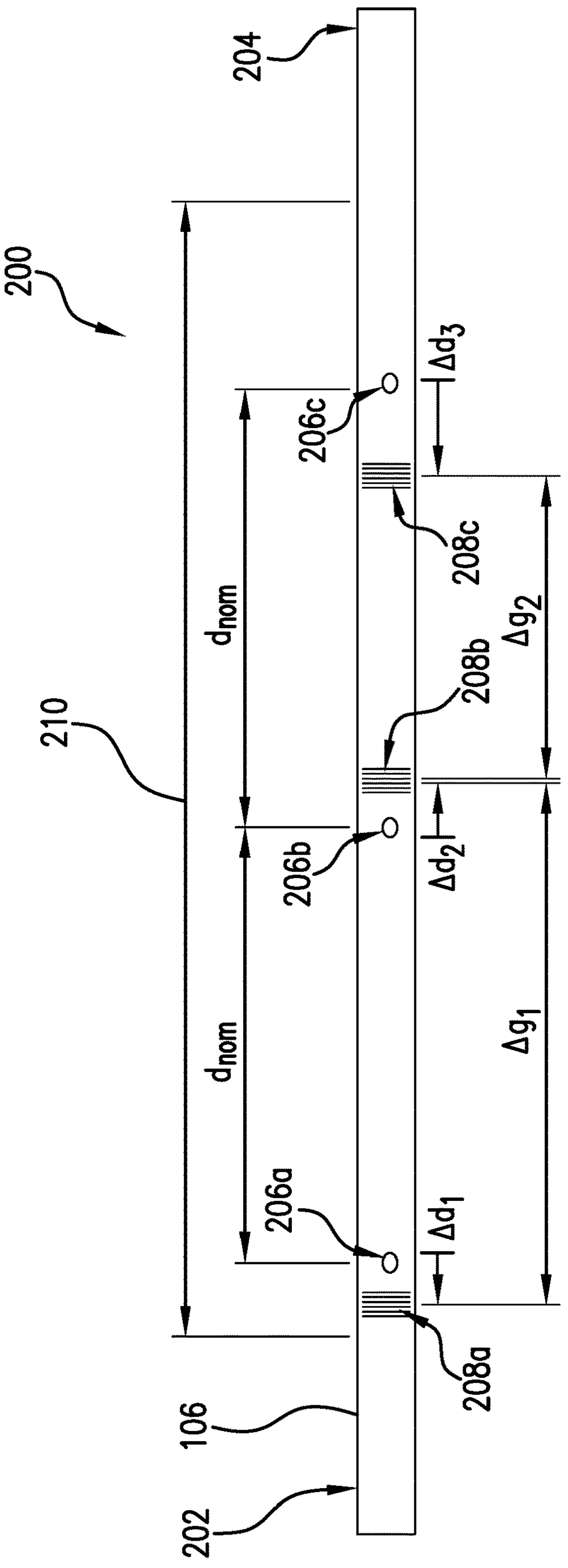
FIG. 2 shows a section of an optical fiber of the optical system, in an illustrative embodiment.

FIG. 2 shows a section 200 of the optical fiber 106 in an illustrative embodiment. The optical fiber 106 extends from a first end 202 (also referred to herein as a "launched end") to a second end 204 along a longitudinal axis. The first end 202 is coupled to the optical interrogation unit 104. The optical fiber 106 includes gratings 208*a*-208*c* at various grating locations in the optical fiber 106. The light pulse generated at the optical interrogation unit 104 enters the optical fiber 106 at the first end 202 and is reflected from the gratings 208a-208c to exit the optical fiber 106 at the first end 202.

The distance between gratings 208a-208c is selected so that there is at least one grating within a light pulse length 210. In practice, at least 3 gratings within a light pulse length is generally preferred to reduce variation of signal due to natural variation in the strength of the grating reflections. In various embodiments, the gratings 208a-208c can be chirped Fiber Bragg gratings (FBGs). A chirped FBG is designed to have a reflection band that has a bandwidth greater than a bandwidth of the light from the laser 110. The bandwidth of the FBG is selected, in part, based on the temperature range of the environment in which the optical fiber 106 is deployed. The central wavelength of an FBG shifts by ~12 pm/C (picometers per degree Celsius). Multiplying this temperature shift by a desired temperature range of the optical fiber 106 sets a lower limit on the bandwidth for the FBG. The laser 110 used in DAS generally has a linewidth that is <<1 pm. In various embodiments, a linewidth of the laser 110 can be within a narrow band of about 10^-7 nanometers, while the bandwidth of the chirped FBG is in a range from about 1 nm to about 10 nm. The wavelength of the laser 110 therefore falls within the reflection band of the chirped FBG. In other words, the bandwidth of the FBG is wide enough to fully reflect light from the laser 110. The gratings 208a-208c having a variable spacing between them, as described herein.

The optical fiber 106 includes a plurality of nominal sites 206a-206c therein. Although only three nominal sites 206a-206c are shown in FIG. 2, the number of grating locations can be in the hundreds or thousands, in various embodiments. The nominal sites 206a-206c are spaced uniformly apart from each other by a nominal separation distance. In other words, a nominal separation distance $d_{nom}$ between the first nominal site 206a and the second nominal site 206b is the same as the nominal separation distance $d_{nom}$ between the second nominal site 206b and the third nominal site 206c.

Each of the plurality of gratings 208a-208c is associated with a respective one of the plurality of nominal sites 206a-206c and is offset from its associated nominal sites 206a-206c by an offset distance. For example, first grating 208a is separated from the first nominal site 206a by first offset distance $\Delta d_1$, second grating 208b is separated from the second nominal site 206b by second offset distance $\Delta d_2$, third grating 208c is separated from the third nominal site 206c by third offset distance $\Delta d_3$, etc. In various embodiments, the offset distance is greater than or equal to a quarter wavelength of the light from the laser 110. When adjacent gratings are separated by the nominal separation distance, destructive interference occurs between the light reflected from these adjacent gratings. The offset distance is introduced and selected to reduce the occurrence of this destructive interference. In one embodiment, introducing an offset distance of a quarter wavelength results in a constructive interference between the light reflected form adjacent gratings.

Each offset distance (Δd1, Δd2, Δd3, . . . ) can be a value selected using a dithering function. In one embodiment, the dithering function can be a function that has an average value of zero and varies within a dithering range defined by a range limit. The offset distance is for a grating is a value selected from within the dithering range using the dithering function. The range limit can be between about 1 micron to about 1 centimeter in length. The offset distance can be a positive number or a negative number, so that the grating can be on either side of its associated nominal site. A positive offset distance is represented in FIG. 2 as an offset to the right from its associated nominal site, and a negative offset distance is represented in FIG. 2 as an offset to the left from its associated nominal site. In various embodiments, the dithering function can be a periodic function oscillating within the range limit or a combination of periodic functions. The dithering function generates the offset distance based on a distance along the optical fiber. Examples of dithering functions include, but are not limited to, a triangle wave function, a sawtooth wave function, a sinusoidal function. In another embodiment, the offset distances can be random distances selected from within the dithering range.

By introducing offset distances, the intra-grating spacing (Δg1, Δg2, . . . ) can be different for any two adjacent gratings. Thus, the first intra-grating spacing $\Delta g_1$ between the first grating 208a and the second grating 208b is different from the second intra-grating spacing $\Delta g_2$ between the second grating 208b and the third grating 208c, etc. In particular $\Delta g_1 = d_{nom} - \Delta d_1 + \Delta d_2$; and $\Delta g_2 = d_{nom} - \Delta d_2 + \Delta d_3$. Additionally, successive offset distances or adjacent offset distances (e.g., $\Delta d_1$ and $\Delta d_2$) cannot be the same or else the resulting intra-grating space (e.g., $\Delta d_1$) remains the same as the nominal distance $d_{nom}$.

Destructive interference can occur when gratings are located at the nominal sites 206a-206c (i.e., evenly spaced from each other by $d_{nom}$) By introducing the offset distance (Δd1, Δd2, Δd3, . . . ) for each of the gratings, the occurrence of destructive interference is reduced or minimized Thus, the signal-to-noise ratio for a signal from the optical fiber 106 disclosed herein having gratings located at selected offset distances (Δd1, Δd2, Δd3, . . . ) from their associated nominal sites 206a-206c is greater than the signal-to-noise ratio for a signal from an optical fiber in which the gratings are located at the nominal sites.

Figure 3:
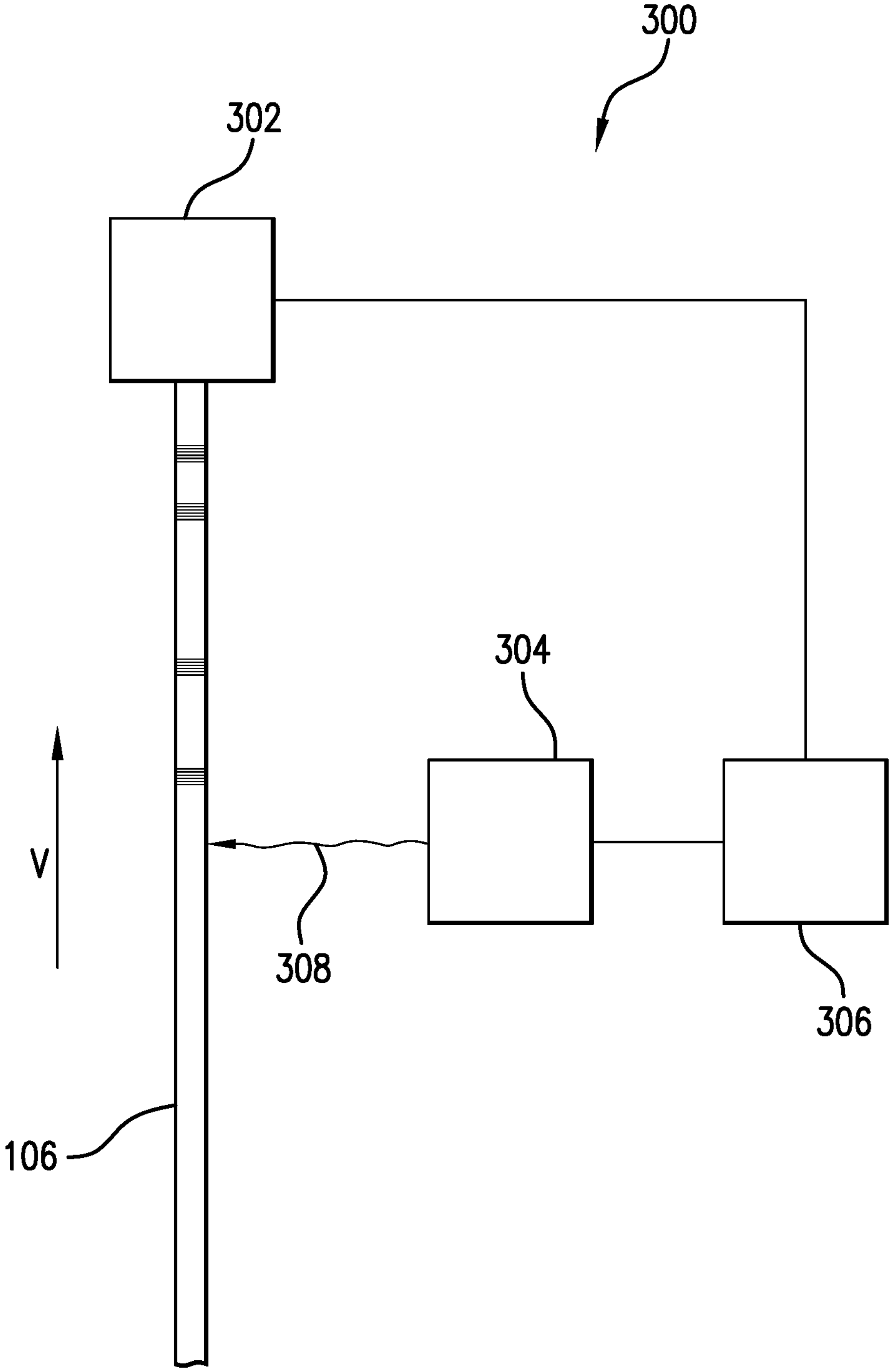
FIG. 3 shows an apparatus for manufacturing the optical fiber of FIG. 2, in an illustrative embodiment.

FIG. 3 shows an apparatus 300 for manufacturing the optical fiber 106 of FIG. 2, in an illustrative embodiment. The apparatus 300 includes a drawing device 302 that draws the optical fiber 106 along a selected direction at a constant draw speed v (or a known draw speed). An optical engraver 304, typically an ultraviolet (UV) pulsed laser, emits a light beam 308 to engrave a grating at selected locations in the optical fiber 106. A processor 306 controls the operation of the optical engraver 304. The processor 306 receives a signal from the drawing device 302 indicating the draw speed. The processor 306 determines or selects an offset distance using the dithering function and determines a grating location based on the defined distance between nominal sites and the selected offset distance. Using the draw speed of the optical fiber 106, the processor 306 activates the optical engraver 304 when the determined grating location passes in front of the optical engraver 304, thereby forming the grating in the optical fiber 106. This process is repeated for subsequent gating locations until the optical fiber is complete.

Figure 4:
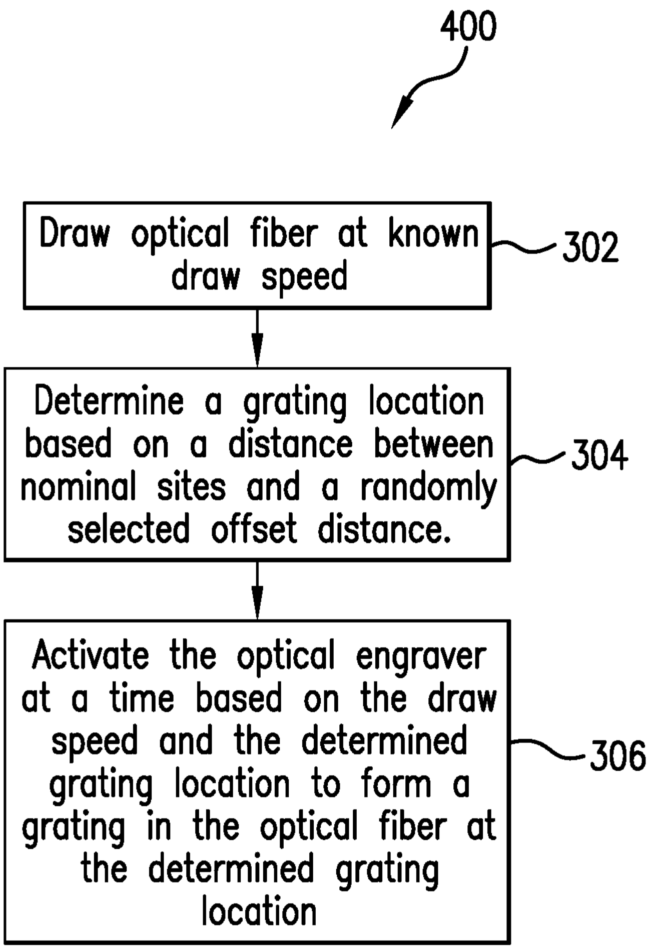
FIG. 4 shows a flowchart for manufacturing the optical fiber.

FIG. 4 shows a flowchart 400 for manufacturing the optical fiber 106. In box 402, an optical fiber is drawn at a known draw speed. In box 404, the processor determining a grating location based on a distance between nominal sites and an offset distance selected using a dithering function. In box 406, the processor activates the optical engraver at a time based on the draw speed and the determined grating location to form a grating in the optical fiber 106 at the determined grating location.

Set forth below are some embodiments of the foregoing disclosure:

Embodiment 1: An optical system for measuring an acoustic signal. The optical system includes an optical interrogator, an optical fiber and a plurality of gratings formed in the optical fiber. The optical interrogator is configured to transmit a light pulse. The optical fiber receives the light pulse, the optical fiber having a plurality of nominal sites uniformly spaced apart along a longitudinal axis of the optical fiber. The plurality of gratings are formed in the optical fiber, with each of the plurality of gratings associated with a nominal site and separated from its associated nominal site by an offset distance. The offset distance is selected to reduce a destructive interference between reflections from the plurality of gratings.

Embodiment 2: The optical system of any prior embodiment, wherein the light pulse transmitted by the optical interrogator defines a light pulse length.

Embodiment 3: The optical system of any prior embodiment, wherein the plurality of nominal sites are spaced apart from each other to at a distance of about one or more nominal sites within a light pulse length.

Embodiment 4: The optical system of any prior embodiment, wherein the plurality of gratings further comprises a plurality of chirped Fiber Bragg gratings.

Embodiment 5: The optical system of any prior embodiment, wherein the offset distance is greater than a quarter wavelength of the light pulse.

Embodiment 6: The optical system of any prior embodiment, wherein the offset distance is selected using a dithering function defined within a dithering range, wherein a range limit of the dithering range is between about 1 micron and about 1 centimeter.

Embodiment 7: The optical system of any prior embodiment, wherein the plurality of gratings includes a first grating separated from a first nominal site by a first offset distance and a second grating separated from a second nominal site by a second offset distance, wherein the first offset distance is a first value selected using the dithering function and the second offset distance is a second value selected using the dithering function.

Embodiment 8: The optical system of any prior embodiment, wherein a signal-to-noise ratio obtained from the plurality of gratings located at the offset distances is greater than the signal-to-noise ratio obtained from the plurality of gratings located at the plurality of nominal sites.

Embodiment 9: A method of measuring an acoustic signal in a wellbore. An optical fiber is disposed in the wellbore, the optical fiber having a plurality of gratings formed therein, each of the plurality of gratings being located at a selected offset distance from a respective one of a plurality of nominal sites of the optical fiber, the plurality of nominal sites being uniformly spaced along a longitudinal axis of the optical fiber, wherein each offset distance is selected to reduce a destructive interference between reflections from the plurality of gratings. An optical interrogator transmits a light pulse into the optical fiber to measure the acoustic signal via a reflection of the light pulse from at least one of the plurality of gratings.

Embodiment 10: The method of any prior embodiment, wherein the light pulse defines a light pulse length.

Embodiment 11: The method of any prior embodiment, wherein the plurality of nominal sites are spaced apart from each other at about one or more nominal sites within a light pulse length.

Embodiment 12: The method of any prior embodiment, wherein the plurality of gratings further comprises a plurality of chirped Fiber Bragg gratings.

Embodiment 13: The method of any prior embodiment, wherein the offset distance is greater than a quarter wavelength of the light pulse.

Embodiment 14: The method of any prior embodiment, wherein the offset distance is selected using a dithering function defined within a dithering range, wherein a range limit of the dithering range is between about 1 micron and about 1 centimeter.

Embodiment 15: The method of any prior embodiment, wherein the plurality of gratings includes a first grating separated from a first nominal site by a first offset distance and a second grating separated from a second nominal site by a second offset distance, wherein the first offset distance is a first value selected using the dithering function and the second offset distance is a second value selected using the dithering function.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An optical system for measuring an acoustic signal, comprising:

an optical interrogator configured to transmit a light pulse;

an optical fiber for receiving the light pulse, the optical fiber having a plurality of nominal sites uniformly spaced apart along a longitudinal axis of the optical fiber; and a plurality of gratings formed in the optical fiber, each of the plurality of gratings associated with a nominal site and separated from its associated nominal site by an offset distance, wherein the offset distance is a random value within a dithering range, the dithering range having an average value of zero, wherein the plurality of gratings comprises a plurality of chirped Fiber Bragg gratings.

2. The optical system of claim 1, wherein the light pulse transmitted by the optical interrogator defines a light pulse length.

3. The optical system of claim 2, wherein the plurality of nominal sites are spaced apart from each other at a distance of about one or more nominal sites within a light pulse length.

4. The optical system of claim 1, wherein the offset distance is greater than a quarter wavelength of the light pulse.

5. The optical system of claim 4, wherein a range limit of the dithering range is between about 1 micron and about 1 centimeter.

6. The optical system of claim 4, wherein the plurality of gratings includes a first grating separated from a first nominal site by a first offset distance and a second grating separated from a second nominal site by a second offset distance, wherein the first offset distance is a first random value and the second offset distance is a second random value.

7. The optical system of claim 1, wherein a signal-to-noise ratio obtained from the plurality of gratings located at the offset distances is greater than the signal-to-noise ratio obtained from the plurality of gratings located at the plurality of nominal sites.

8. A method of measuring an acoustic signal in a wellbore, comprising:

disposing an optical fiber in the wellbore, the optical fiber having a plurality of gratings formed therein, each of the plurality of gratings being located at a selected offset distance from a respective one of a plurality of nominal sites of the optical fiber, the plurality of nominal sites being uniformly spaced along a longitudinal axis of the optical fiber, wherein each offset distance is a random value within a dithering range, the dithering range having an average value of zero, wherein the plurality of gratings comprises a plurality of chirped Fiber Bragg gratings; and an optical interrogator configured to transmit a light pulse into the optical fiber to measure the acoustic signal via a reflection of the light pulse from at least one of the plurality of gratings, wherein the offset distances of the plurality of gratings reduce a destructive interference between reflections from the plurality of gratings.

9. The method of claim 8, wherein the light pulse defines a light pulse length.

10. The method of claim 9, wherein the plurality of nominal sites are spaced apart from each other at about one or more nominal sites within a light pulse length.

11. The method of claim 8, wherein the offset distance is greater than a quarter wavelength of the light pulse.

12. The method of claim 8, wherein a range limit of the dithering range is between about 1 micron and about 1 centimeter.

13. The method of claim 12, wherein the plurality of gratings includes a first grating separated from a first nominal site by a first offset distance and a second grating separated from a second nominal site by a second offset distance, wherein the first offset distance is a first random value and the second offset distance is a second random value.

* * * * *